United States Patent
Brickell

(10) Patent No.: US 7,509,498 B2
(45) Date of Patent: Mar. 24, 2009

(54) DIGITAL SIGNATURE VALIDATION

(75) Inventor: Ernie F. Brickell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 853 days.

(21) Appl. No.: 09/896,129

(22) Filed: Jun. 29, 2001

(65) Prior Publication Data

US 2003/0005305 A1    Jan. 2, 2003

(51) Int. Cl.
*H04L 9/00* (2006.01)
(52) U.S. Cl. .................................. 713/177; 713/157
(58) Field of Classification Search ................. 713/156, 713/157, 175, 177; 705/76
See application file for complete search history.

(56) References Cited

U.S. PATENT DOCUMENTS

| | | | | |
|---|---|---|---|---|
| 5,428,795 A | * | 6/1995 | Johnson et al. | 710/240 |
| 5,638,446 A | * | 6/1997 | Rubin | 705/51 |
| 5,659,616 A | * | 8/1997 | Sudia | 705/76 |
| 5,822,408 A | * | 10/1998 | Bourbon | 379/100.02 |
| 5,872,848 A | * | 2/1999 | Romney et al. | 713/176 |
| 6,021,202 A | * | 2/2000 | Anderson et al. | 705/54 |
| 6,209,095 B1 | * | 3/2001 | Anderson et al. | 713/176 |
| 6,233,577 B1 | * | 5/2001 | Ramasubramani et al. | 707/9 |
| 6,292,897 B1 | * | 9/2001 | Gennaro et al. | 713/175 |
| 6,405,219 B2 | * | 6/2002 | Saether et al. | 707/201 |

OTHER PUBLICATIONS

Garfinkel (Simson Garfinkel and Gene Spafford, "Web Security & Commerce", ISBN: 1565922697, 1997), p. 140.*
Stein (Lincoln D. Stein, "Web Security A Step-by-Step Reference Guide", ISBN: 0201634899, 1997), p. 26, 41, 63-65.*
Feghhi (Jalal Feghhi, Jalil Feghhi and Peter Williams, "Digital Certificate. Applied Internet Security.", ISBN:0201309807, 1999), p. 61, 66-68,142.*
SWCP, "Well-Known Port Numbers", http://www.swcp.com/pcaskey/port-numbers, Dec. 2000, (32 sheets total).*
Feghhi (Jalal Feghhi, Jalil Feghhi and Peter Williams, "Digital Certificate. Applied Internet Security.", ISBN: 0201309807, 1999), p. 148.*
Feghhi et al. (Jalal Feghhi, Jalil Feghhi, Peter Williams, Digital Certificates Applied Internet Security, 1999, ISBN: 0201309807), p. 74-49.*
Feghhi et al. (Jalal Feghhi, Jalil Feghhi, Peter Williams, Digital Certificates Applied Internet Security, 1999, ISBN: 0201309807), p. 61 and 74-76.*

\* cited by examiner

*Primary Examiner*—Kambiz Zand
*Assistant Examiner*—Peter Poltorak
(74) *Attorney, Agent, or Firm*—Fish & Richardson P.C.

(57) ABSTRACT

A second digital credential that includes a first digital credential and a digital signature is received, and the validity of the second digital credential is determined. A determination is made whether the first digital credential is valid based on the validity of the second digital credential.

6 Claims, 4 Drawing Sheets

DIGITAL SIGNATURE VALIDATION

BACKGROUND

This invention relates to digital signature validation.

As part of Internet based transactions, one party often needs to rely on the integrity of digital credentials provided by a second party.

A party's digital credentials refer to the security mechanisms associated with the party's identity. Validating a party's digital credentials can involve various tasks such as verifying that the party's digital signature is valid using a public key in the party's digital certificate. It also can include validating the digital certificate by using a key from a certificate authority to validate that the digital signature is valid. Validating the digital certificate also can include verifying that the digital certificate has not been revoked or suspended and validating the key from the certificate authority.

DETAILED DESCRIPTION

Figure 1:
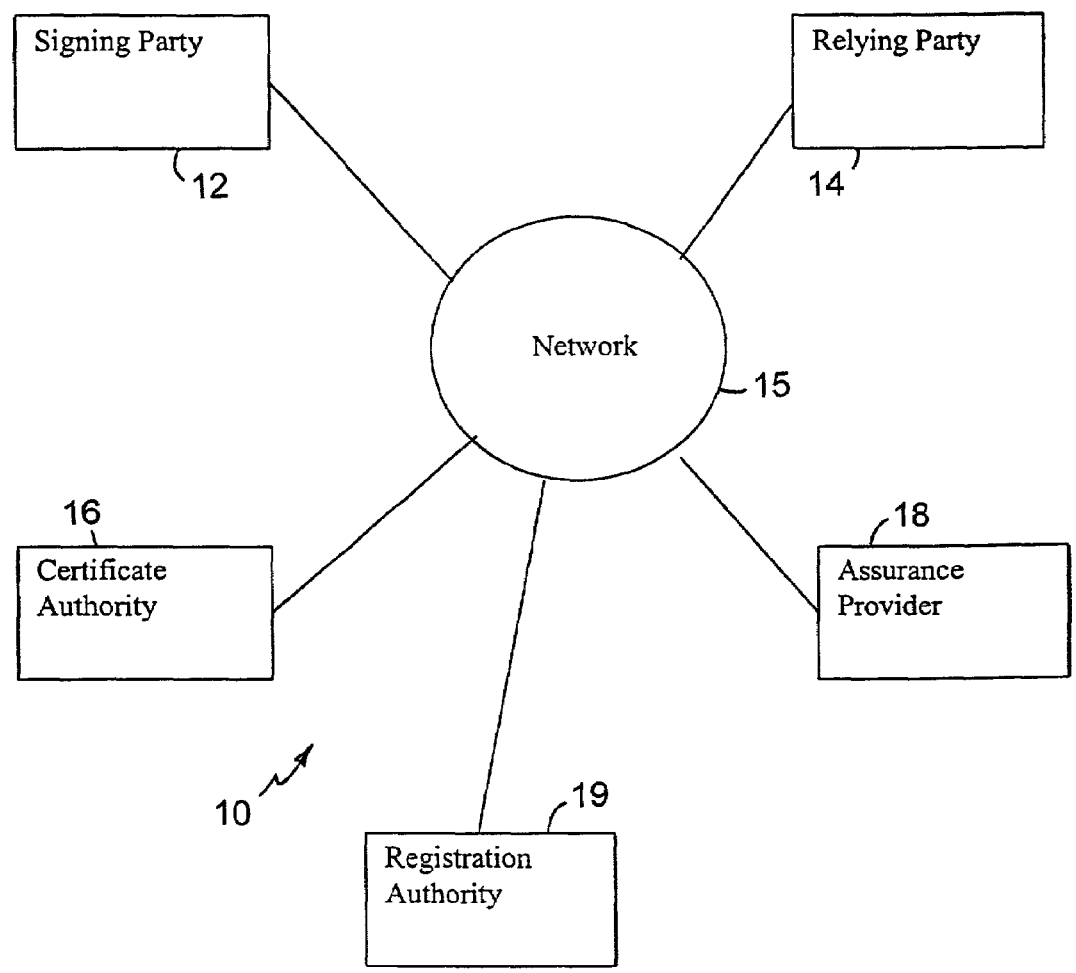
FIG. 1 illustrates a computer network system.

As shown in FIG. 1, a computer network system 10 includes a signing party 12 that can communicate with a relying party 14 over a computer network 15. The network can include, for example, a local area network (LAN), a wide area network (WAN), the World Wide Web (Web) or other computer network.

The relying party 14 can be a computer network provider of goods or services such as a business-to-consumer Web based provider of goods or services. For example, the relying party 14 can be a Web based retailer of consumer products such as books, software toys, games and the like. Alternatively, the relying party 14 can be a business-to-business Web site such as an online marketplace for medical supplies or other types of supplies. Other examples include online banking institutions, brokerage firms, and health care services. Although a single relying party 14 is shown in system 10, the system can include more than one relying party communicating over the network 15.

The signing party 12 can be an individual consumer or a business entity interested in entering into a business transaction with the relying party 14. For example, the signing party 12 may desire to purchase goods from a Web based retailer. The signing party 12 can communicate with the relying party 14 by using a personal computer (PC) capable of connecting to the network, or other network capable computer device. Although a single signing party 12 is shown in system 10, the system can include more than one signing party communicating over the network 15.

A certificate authority 16 may be a networked based authority that can issue and manage digital credentials, such as digital certificates, for the signing party. For example, the signing party 12 may request a digital certificate from the certificate authority 16 when the signing party 12 contemplates entering into a business transaction with the relying party 14. Similarly, the relying party 14 can contact the certificate authority 16 and request the digital certificate of signing party 12 during the course of business.

As part of the public key infrastructure (PKI), the certificate authority 16 can check with a registration authority 19 to verify whether the information in the request for a digital certificate provided by the signing party 12 is valid. Depending on the particular PKI implementation, the digital certificate can include the signing party's public verification key, the expiration date of the certificate, the signing party's name, and other information about the signing party. A private key of the certificate authority 16 should sign the digital certificate.

An assurance provider 18 may be a network service provider that can provide assurance to the relying party 14 that the digital credentials accompanying a business transaction provided by the signing party 12 are valid. Digital credentials can include a signed document, a digital signature associated with the document and a certificate of the signing party. When the signing party 12 contemplates entering into a business transaction with the relying party 14, it can request the services of the assurance provider 18 over the network using a secure protocol such as a secure socket layer (SSL). SSL is a security protocol for managing the transmission of messages over a computer network such as the Internet.

Figure 2:
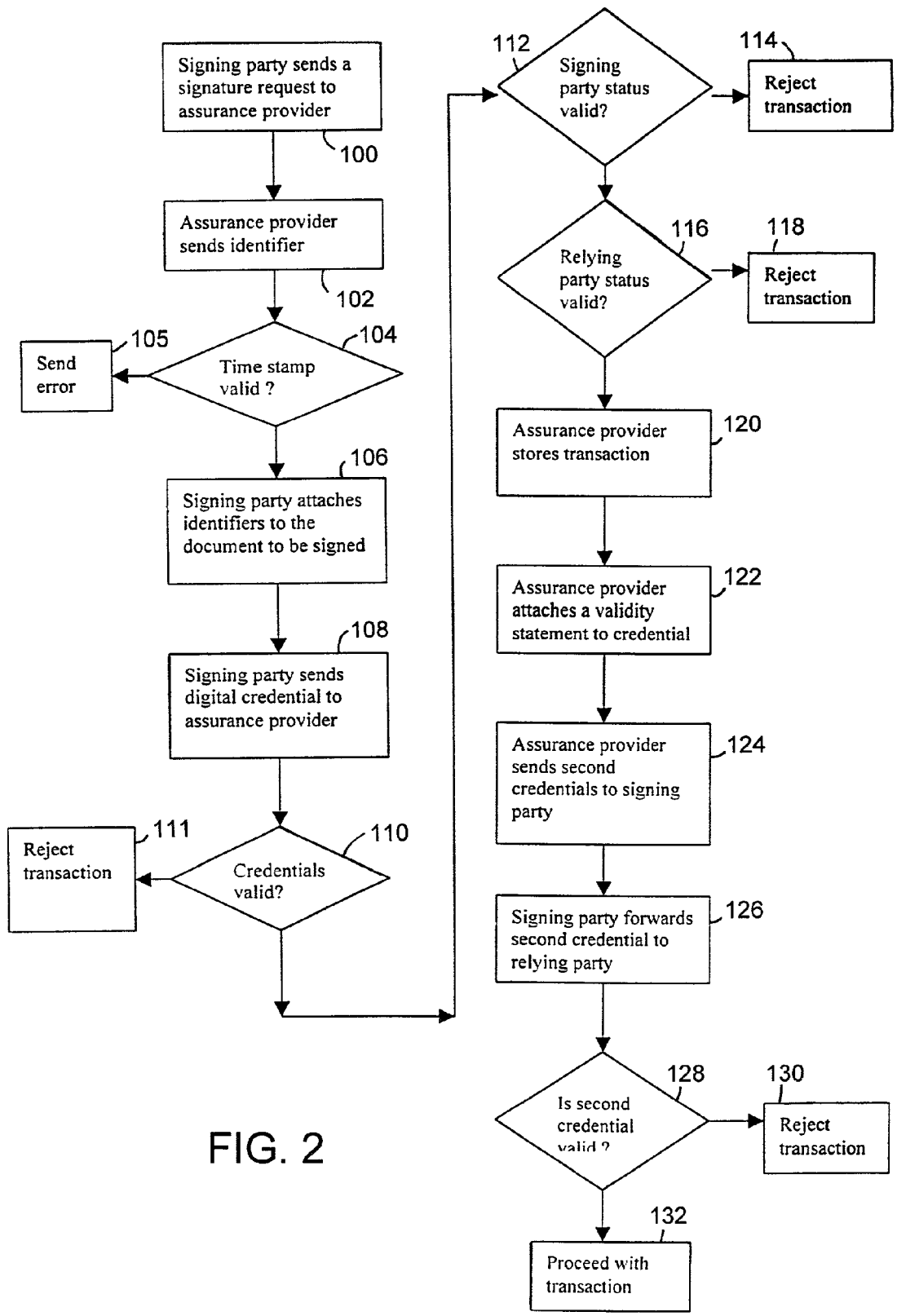
FIG. 2 is a flow chart of a method for validating signatures.

As shown in FIG. 2, the signing party 12 sends 100 a signature request to the assurance provider 18 indicating that the signing party 12 desires to enter into a business transaction with the relying party 14. An example of a business transaction includes the signing party 12 purchasing goods or services from the relying party 14. The transaction may require the signing party 12 to digitally sign a document such as a purchase order. The signing party 12 and the assurance provider 18 can communicate over the network 15 using SSL.

After the assurance provider 18 receives the signature request from the signing party 12, the assurance provider responds by sending 102 one or more identifiers to the signing party 12. The identifier can be a unique number based on a random number called a "nonce." The identifier also can include a time-stamp reflecting the time the signature request was received by the assurance provider 18. As discussed in detail below, the time stamp can be used by the relying party 14 to check when the digital credential of the signing party 12 was validated by the assurance provider 18.

The assurance provider 18 can have mechanisms to detect potentially fraudulent transactions. For example, the assurance provider may keep a record of typical activity of the signing party 12 and could then detect if some particular transaction, or some group of transactions, is atypical. Also, the signing party 12 could indicate to the assurance provider the types of transactions that should be expected, and perhaps the time and value of expected transactions. Then a transaction that did not meet these expectations could be flagged as potentially fraudulent. If the assurance provider 18 identified a transaction as potentially fraudulent, then the assurance provider could follow some predetermined course of action, which could include rejecting the transaction and notifying the signing party of the potentially fraudulent transaction.

Upon receipt of the identifier(s) from the assurance provider 18, the signing party 12 checks 104 whether the time indicated by the time stamp matches the time the signature request was generated based on the identifier(s). If the check reveals a discrepancy between the time in the time stamp and the time the signature request was generated, then the signing party 12 can send 105 an error notification to the assurance provider 18. It also can take remedial action such as terminate the transaction. If the check reveals that the times match, then the signing party 12 can proceed with the transaction.

Figure 3:
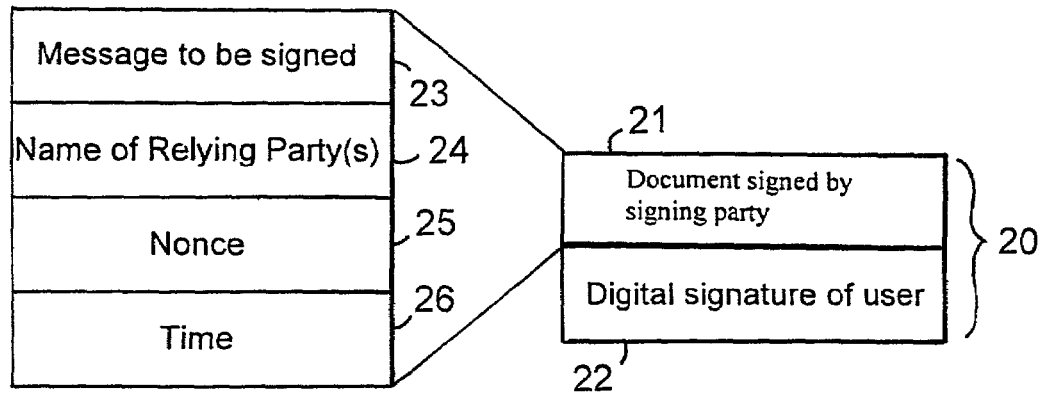
FIGS. 3-4 illustrate data communicated over the computer network system.

The signing party 12 creates 106 a first digital credential 20 (FIG. 3) that can include a first document to be signed 21 and a first digital signature 22. The first document to be signed 21 can include a message 23 to be signed by the signing party. The signing party 12 can append to the document to be signed 21 the name(s) of one or more relying party(s) 24 that are to receive the first digital credential 20 in connection with the business transaction. In addition, the nonce 25 and the time stamp 26 and any other fields in identifier previously sent by the assurance provider 18 can be included in the first document to be signed 21.

After the first document to be signed 21 has been created, the signing party 12 produces a first digital signature 22. To sign the message or other document digitally, the signing party can perform a computation that takes the document to be signed 21 and a private signature key associated with the signing party 12 as input and produces the first digital signature 22. To simplify the discussion, it is assumed that the signing party 12 has previously obtained a private signature key and a public verification key pair, and has obtained a certificate for this public key from the certificate authority 14.

After the signing party 12 generates the first digital credential 20, the signing party 12 sends 108 the credential 20 to the assurance provider 18. The assurance provider 18 checks 110 whether the first digital signature 22 is correct, for example, by performing a computation that takes the message 23, the first digital signature 22, and the public verification key of the signing party 12 as input and produces an output that indicates whether the signature is verified. If the result of the computation indicates that the signature failed to verify, then the assurance provider 18 rejects 111 the business transaction associated with the first digital credential 20.

If the result of the computation (at block 110) indicates that the signature is verified, the assurance provider 18 proceeds to check 112 the status of the signing party 12, including checking whether the private signature key associated with the signing party 12 is still valid. That can be accomplished by verifying whether the digital certificate, associated with the signing party 12, has been revoked by the certificate authority 16 that originally issued the digital certificate. The assurance provider 18 checks whether the value of the nonce 25 and the time-stamp 26 previously sent to the signing party 12 (in block 102) match the nonce and time-stamp in the first document to be signed 21 sent by the signing party at block 108. The business transaction associated with the first digital credential 20 can be rejected 114 if the signing party status check indicates a failure.

If the result of the signing party status check (at block 112) is successful, the assurance provider 18 proceeds to check 116 the status of the relying party 14. The relying party 14 can be identified by the relying party 24 specified in the first signed document 20. Checking the status can include verifying that the relying party 14 has a contract with the assurance provider 18. The assurance provider 18 also can check whether the business transaction associated with the first digital credential 20 falls within limits or complies with policies previously established by the relying party 14. If the check fails, then the business transaction can be rejected 118. On some transactions there may be no requirement to check the status of the relying party 14.

If the result of checking (at block 116) is successful, the assurance provider 18 proceeds to store 120 information related to the business transaction. This information can include the digital credential 20 and result of the transaction. The assurance provider 18 also can allow the signing party to view some or all of the business transactions and the signed documents generated by the signing party. For example, the assurance provider 18 can create a database of business transactions which the signing party can view using a computer connected to the assurance provider through the network 15.

Figure 4:
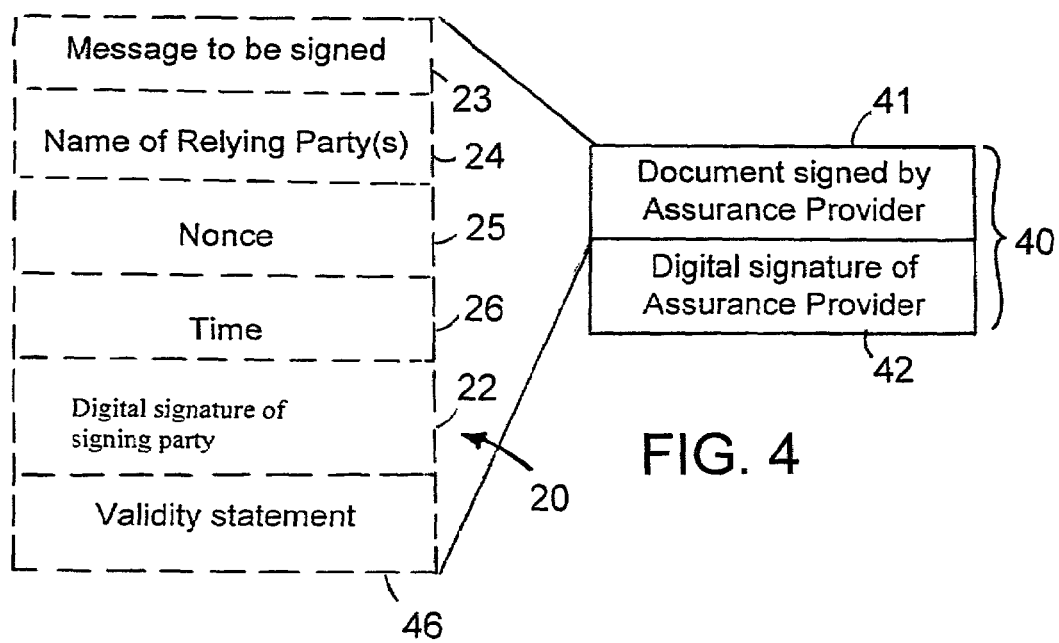

The assurance provider 18 creates 122 a second digital credential 40 (FIG. 4) which can include a second document to be signed 41 and a second digital signature 42. The second document to be signed 41 can incorporate the contents of the first document to be signed 21 such as the message 23, the name of the relying party 24, the nonce 25 and the time stamp 26. The first document to be signed 41 also can include the first digital signature 22 of the signing party.

The assurance provider 18 attaches a validity statement 46 to the second document to be signed 41. The statement 46 can indicate whether the digital certificate of the signing party is valid and whether the business transaction contemplated by the signing party 12 is within pre-established limits set by the relying party 14. The assurance provider 18 produces a second digital signature 42 using the second document to be signed 41, the validity statement 46, and the private signature key of the assurance provider 18 as input. After the assurance provider 18 forms the second digital credential 40, it sends 124 the credential to the signing party 12.

Upon receipt of the second digital credential 40, the signing party 12 forwards 126 the digital credential to the relying party 14 associated with the business transaction contemplated by the signing party 12. The digital credential includes the second signed document, and could include the first signed document and the certificate of the signing party 12. The relying party 14 checks 128 whether the second digital signature 42 is correct by performing a computation that takes the second document to be signed 41, the second digital signature 42, and the public verification key of the assurance provider 18 as input, and produces as output an indication of whether the signature is verified.

The relying party 14 could also check the time stamp of the assurance provider, as the relying party might not want to accept a transaction that was old. The relying party could also check the validity statement 46 of the assurance provider to see if it met the requirements necessary for the transaction.

Although the relying party 14 could check the validity of the first digital signature 22 in the first digital credential 20, that may be unnecessary because the second digital signature 42 generated by the assurance provider 18 can provide assurance that the first digital signature is valid. For example, the assurance provider 18 can provide assurance that the private signature key of the signing party 12 was valid at the time the first digital signature was created based on the time stamp 26. If the result of computation indicates that the signature failed to verify, the business transaction is rejected 130.

On the other hand, if the result of the computation indicates that the signature is verified, the relying party 14 can accept the business transaction and proceed with other aspects of the transaction such as processing information in the message 23. Even after the transaction has been validated by the assurance provider 18, the assurance provider may subsequently be notified by the certificate authority 16 that the digital certificate of the signing party 12 has been revoked. The assurance provider 18 then can notify the relying party 14 that the previously approved transaction should be revoked.

Figure 5:
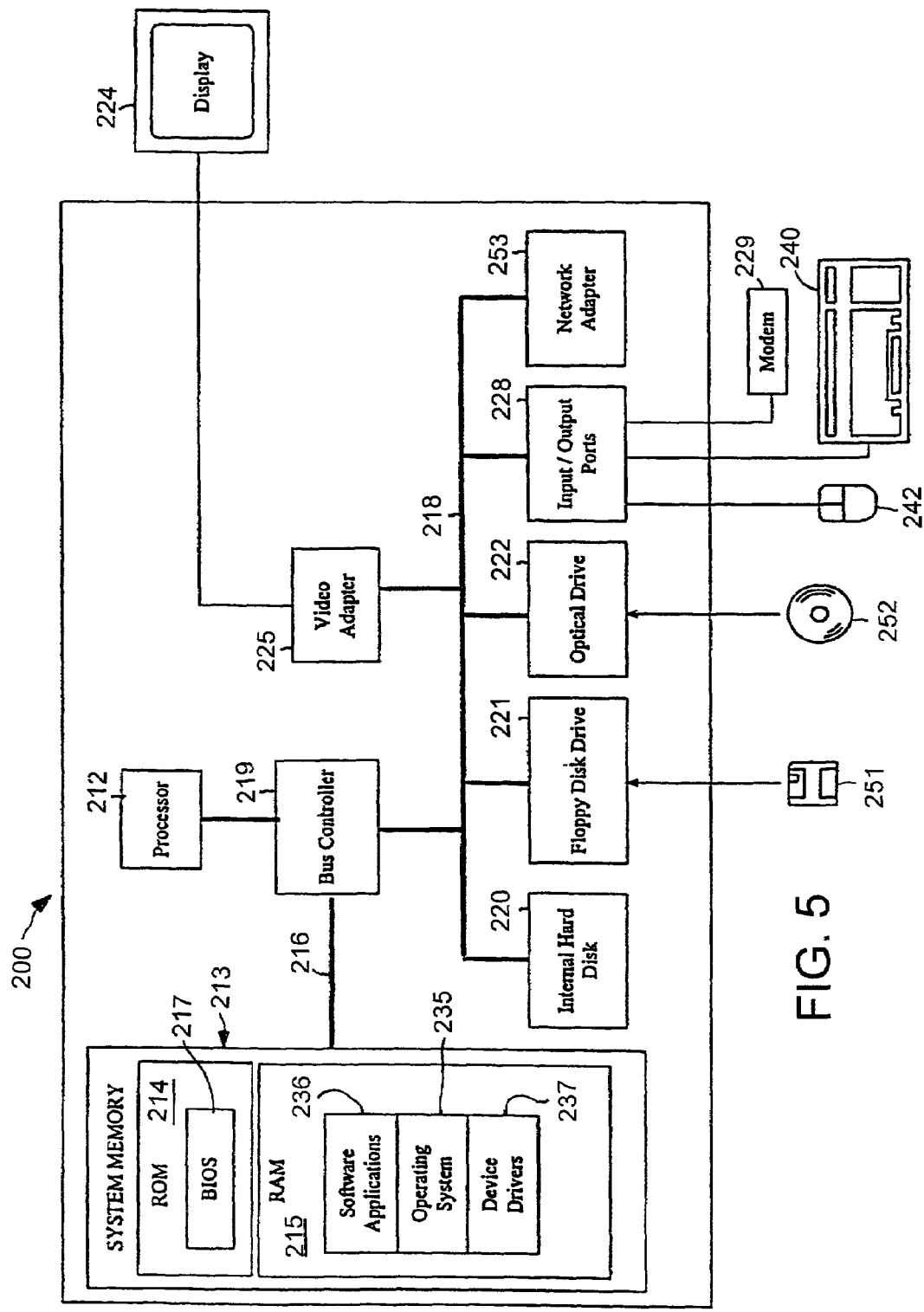
FIG. 5 illustrates a computer system.

FIG. 5 illustrates a programmable computing system 200 that can provide an operating environment suitable for use by the signing party 12, the relying party 14, the certificate authority 16, the assurance provider 18, or the registration authority 19. The system 200 includes a processor 112 such as the Intel PENTIUM® processor. In various configurations, the system 200 can represent any server, personal computer, laptop or a hand held device, a personal digital assistant (PDA) or a network enabled cellular phone.

The system 200 has system memory 213, including read only memory (ROM) 214 and random access memory (RAM) 215 which can be connected to the processor 212 by a system data/address bus 216. The input/output (I/O) bus 218 is connected to the data/address bus 116 by a bus controller 219. In one embodiment, the I/O bus 218 is implemented as a standard Peripheral Component Interconnect (PCI) bus. The bus controller 219 examines signals from the processor 212 to route the signals to the appropriate bus. Signals between the processor 212 and the system memory 213 are passed though the bus controller 219. However, signals from the processor 212 intended for devices other than system memory 213 are routed onto the I/O bus 218.

Various devices are connected to the I/O bus 218 including a hard disk drive 220, a floppy drive 221 that is used to read a floppy disk 251, and an optical drive 222 such as a CD-ROM drive that is used to read an optical disk 252. A video or other display 224 is connected to the I/O bus 218 by a video adapter 225.

The signing party 12 can enter commands and information into the system 200 by using a keyboard 240 and/or pointing device, such as a mouse 242, connected to bus 118 through I/O ports 228. The system 200 also includes a modem 229 and a network adapter 253 that can be used to communicate over the network 15 using wired or wireless connection.

Software applications 236 and data are typically stored by one of the memory storage devices, which may include the hard disk 220, the floppy disk 251, and the CD-ROM 252 and are copied to RAM 215 for execution. The operating system 235 executes software applications 236 and carries out instructions issued by the signing party. The Basic Input/Output System (BIOS) 217 for the system 200 includes a set of basic executable routines that help transfer information between the computing resources within the system 200. Operating system 235 and other software applications 236 use these low-level service routines.

The foregoing techniques can provide the relying party 14 assurance that a digital signature is valid at the time it was generated by the signing party 12. The relying party 14 can rely on the validity of the digital signature of the signing party without contacting the certificate authority 16 to check the status of the certificate of the signing party. It may no longer be necessary for the relying party 14 to contact the certificate authority or the assurance provider to verify the digital signature of the signing party. As a result, the demand or load previously placed on the relying party 14 may be reduced. Instead, the signing party is responsible for establishing a connection with the assurance provider to provide assurance that the signing party's digital signature is valid.

The foregoing techniques also provide security advantages. For example, if an unauthorized agent obtains temporary access to the private signature key of the signing party, the unauthorized agent will need to obtain all the digital second signatures from the assurance provider while the unauthorized agent has such access. In some cases, the assurance provider can detect the occurrence of several signatures during a certain time frame and take corrective action. The assurance provider can maintain a log of the business transactions, including fraudulent transactions, which can be viewed by the signing party at a later time.

Additionally, the foregoing techniques can provide a mechanism to reduce the incidence of spoofing on the Web. For example, the relying party may be a web site that is presenting a form to the signing party to sign. In some instances, it may be possible for an unscrupulous relying party to present on the signing party's screen something different than what is actually being signed by the signing party's key. Instead, the techniques presented here allow the signing party to connect to the Web site provided by the assurance provider during the signature operation. The Web site of the assurance provider could display a verification screen with the information which is being given to the signing party again and, thus, minimize spoofing.

Various modifications may be made. For example, the time stamp can be attached to the first digital document after the first digital signature has been validated by the assurance provider.

Various features of the system can be implemented in hardware, software, or a combination of hardware and software. For example, some aspects of the system can be implemented in computer programs executing on programmable computers. Each program can be implemented in a high level procedural or object oriented programming language to communicate with a computer system. Furthermore, each such computer program can be stored on a storage medium, such as read-only-memory (ROM) readable by a general or special purpose programmable computer or processor, for configuring and operating the computer when the storage medium is read by the computer to perform the functions described above.

Other implementations are within the scope of the following claims.

What is claimed is:

1. A method comprising:
   sending a first digital credential to a first entity that can confirm the validity of the first digital credential;
   receiving from the first entity a second digital credential that includes
   the first digital credential and
   a validity statement certifying that
   a private signature key of an entity associated with the first digital credential is valid by indicating that a digital certificate associated with the first digital credential has not been revoked and
   a business transaction associated with the first digital credential is valid; and
   forwarding the second digital credential to a second entity to establish the validity of the private signature key of the entity associated with the first digital credential based on the validity statement.

2. The method of claim 1 wherein the first digital credential includes an identifier provided by the first entity in response to a signature request.

3. An apparatus comprising:
   at least one port for sending and receiving information; and
   a processor configured to:
   send through the at least one port a first digital credential to a first entity that can confirm the validity of the first digital credential; and
   forward through the at least one port a second digital credential to a second entity, in response to receiving through the at least one port from the first entity the second digital credential that includes
   the first digital credential and
   a validity statement certifying that
   a private signature key of an entity associated with the first digital credential is valid by indicating that a digital certificate associated with the first digital credential has not been revoked and
   a business transaction associated with the first digital credential is valid;
   wherein the forwarding of the second digital credential to the second entity through the at least one port is based on the validity statement.

4. The apparatus of claim 3 wherein the first digital credential includes an identifier provided by the first entity in response to a signature request.

5. An article comprising a computer-readable medium that stores computer executable instructions for causing a computer system to:

send a first digital credential to a first entity that can confirm the validity of the digital credential, and forward a second digital credential to a second entity, in response to receiving from the first entity the second digital credential that includes the first digital credential and a validity statement certifying that a private signature key of an entity associated with the first digital credential is valid by indicating that a digital certificate associated with the first digital credential has not been revoked and a business transaction associated with the first digital credential is valid;

wherein the forwarding of the second digital credential to the second entity through the at least one port is based on the validity statement.

6. The article of claim 5 including instructions for causing the computer system to send a first digital credential including an identifier provided by the first entity in response to a signature request.

* * * * *